3,739,019
PREPARATION OF OPTICALLY ACTIVE
TRANS-CHRYSANTHEMIC ACID
Kenzo Ueda, Nishinomiya, and Yoshio Suzuki, Amagasaki, Japan, assignors to Sumitomo Chemical Company, Ltd., Osaka, Japan
No Drawing. Filed June 29, 1970, Ser. No. 50,931
Claims priority, application Japan, July 2, 1969, 44/52,619
Int. Cl. C07c 51/42, 61/16, 87/78
U.S. Cl. 260—514 H        7 Claims

ABSTRACT OF THE DISCLOSURE

An optical resolution method for preparation of (+)-trans-chrysanthemic acid which comprises using as a resolution agent a novel amine represented by the formula,

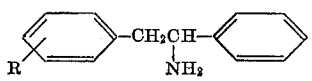

wherein R is an alkyl having 1 to 3 carbon atoms or a halogen atom.

---

This invention relates to a process for the preparation of optically active trans-chrysanthemic acid.

Chrysanthemic acid is an essential component of esters which are named as so-called pyrethroidal insecticides such as pyrethrin, allethrin, phthalthrin and the like which are useful as an insecticide having low toxicity and rapid effect.

Trans-chrysanthemic acid esters have generally insecticidal effects higher than those of the corresponding cis-chrysanthemic acid esters and (+)-trans-chrysanthemic acid esters have the most insecticidal effect among those of the other corresponding stereoisomeric esters.

Accordingly, it is very important to prepare (+)-trans-chrysanthemic acid advantageously from industrial point of view.

The optical resolution method which is one of important methods for preparing the optically active chrysanthemic acid is known to be industrially advantageous in combination with racemization of the antipode.

Further, it is known to use natural alkaloids for the optical resolution of acids, for example, optically active chrysanthemic acid is prepared by using natural alkaloids such as quinine together with optically active α-phenethylamine. [Campbell & Harper, Journal of Chemical Society, 1945, 283, and Campbell and Harper Journal of the Science of Food and Agriculture, 3, 189 (1952).]

This method, however, cannot be carried out without difficulties mentioned below.

Firstly, quinine of the natural alkaloid is very expensive and cannot be supplied stably.

Secondly, the method comprises complicated and difficult processes mentioned below.

What is firstly obtained in crystalline state is quinine salt of (—)-trans-chrysanthemic acid and in order to obtain (+)-trans-chrysanthemic acid, the mother liquor is concentrated and is subjected to decomposition to obtain (+)-trans-rich acid.

And (+)-trans-chrysanthemic acid cannot be obtained until the trans-rich acid is further subjected to resolution with use of (—)-α-phenethylamine.

In the above processes, it takes long period of time to crystallize quinine salt of (—)-trans-chrysanthemic acid because of low crystallizability thereof, and quinine used can be hardly recovered because of low crystallizability and difficulty of distillation.

Thus, the object of the present invention is to provide a process for the preparation of optically active trans-chrysanthemic acid with easier operations, compared with those of the conventional methods.

The object can be accomplished by provision of a process for preparation of (+)-trans-chrysanthemic acid which comprises reacting (±)-trans-chrysanthemic acid with an optically active organic amine represented by the formula,

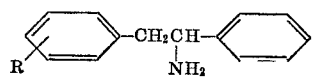

wherein R is an alkyl group having 1 to 3 carbon atoms or a halogen atom, to form the amine salt of (+)-trans-chrysanthemic acid and recovering (+)-trans-chrysanthemic acid.

In carrying out the present invention, more detailed illustration will be given as follows.

The optically active organic amine having the above mentioned formula is a novel compound and is easily prepared as follows.

Friedel-Crafts acylation of benzene with the corresponding phenylacetyl chloride gives the benzylphenyl-ketone, which is converted to the amine by the Leuckart reaction. The thus obtained racemic amine is resolved with (+)-aspartic acid to afford the optically active amine.

Examples of the amine used in the present invention include (+) - α - (p-methylbenzyl)benzylamine, $[\alpha]_D^{20}$ +12.5° and (+)-α-(p-chlorobenzyl)benzylamine.

In carrying out the present invention a solution containing about one mol of the amine and a solvent is mixed with a solution containing about one mol of (±)-trans-chrysanthemic acid, which may contain a small amount of (±)-cis-chrysanthemic acid, thereby to instantly deposit crystals of the amine salts, and the mixture is heated to a temperature lower than a boiling point of the solvent used to dissolve the salts and is cooled to about —5° to about 20° C. to form crystals of the amine salts. The reaction may be carried out at room temperature.

The crystals are separated by filtration and if necessary, recrystallized from a suitable solvent to obtain the amine salt of (+)-trans-chrysanthemic acid.

The thus obtained salt is decomposed with use of an aqueous solution of an acid such as hydrochloric acid and sulfuric acid or an aqueous solution of an alkali such as potassium hydroxide and is subjected to decomposition with an alkali or an acid to obtain the amine used or (+)-trans-chrysanthemic acid.

Examples of the solvent used for dissolving the amine and (±)-trans-chrysanthemic acid, and for recrystallizing the amine salt include an alcohol such as methanol and ethanol, a ketone such as acetone and methyl ethyl ketone, an ether such as tetrahydrofuran and dioxane, dimethylformamide, dimethylsulfoxide, a mixture thereof, and an aqueous mixture thereof.

Thus, (+)-trans-chrysanthemic acid may be easily prepared and the amine used may also be easily recovered.

The present invention will be illustrated by referring to the following examples, which are, of course, not to limit the scope of the present invention.

EXAMPLE 1

A solution of 21.1 g. of (+)-α-(p-methylbenzyl)benzylamine, $[\alpha]_D^{20}$ +12.5°, and 50 cc. of ethanol was added to a solution of 16.8 g. of (±)-trans-chrysanthemic acid and 150 cc. of ethanol. The mixture was heated and thereafter cooled to room temperature to deposit crystals of the amine salt, which were further recrystallized from 60 cc. of ethanol, thereby to obtain 12.1 g. of the amine salt of (+)-trans-chrysanthemic acid, yield 32%, M.P. 150°–151° C.

The amine salt was dissolved in aqueous 10% sodium hydroxide solution and the solution was subjected to extraction with ether to recover (+)-α-(p-methylbenzyl)benzylamine, total recovery combined with the amine from the mother liquor: 20 g., B.P. 108°–115° C./0.1 mm. Hg.

The aqueous layer was acidified with hydrochloric acid and was subjected to extraction with methylene chloride, to obtain 5.1 g. of (+)-trans-chrysanthemic acid, yield 30%, B.P. 111°–113° C./2 mm. Hg, $[\alpha]_D^{20}$ +14.0° (ethanol).

EXAMPLE 2

A solution of 16.8 g. of (+)-α-(p-chlorobenzyl)benzylamine and 70 cc. of ethanol was mixed with a solution of 12.2 g. of (±)-trans-chrysanthemic acid and 100 cc. of ethanol and 35 cc. of water was further added thereto. The mixture was heated and thereafter cooled to room temperature to deposit crystals, which were separated by filtration and recrystallized from 70 cc. of 80% ethanol, thereby to obtain 10.7 g. of crystals of the amine salt, yield 37%, M.P. 150°–151° C.

The crystals were dissolved in aqueous 10% sodium hydroxide solution and the solution was subjected to extraction with ether to recover (+)-α-(p-chlorobenzyl)benzylamine, B.P. 110°–115° C./0.04 mm. Hg.

The aqueous layer was acidified with hydrochloric acid and subjected to extraction with ether to obtain 4.4 g. of (+)-trans-chrysanthemic acid, B.P. 85°–90° C./0.5 mm. Hg, $[\alpha]_D^{23}$ +19.51° (neat), optical purity about 95%.

What we claim is:

1. A process for the preparation of (+)-trans-chrysanthemic acid, which comprises mixing (±)-trans-chrysanthemic acid in an organic solvent selected from the group consisting of methanol, ethanol, acetone, dioxane, dimethylformamide, dimethylsulfoxide, mixtures thereof, and aqueous mixtures thereof, with a dextrorotatory amine represented by the formula,

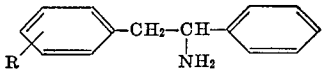

wherein R is an alkyl group having 1 to 3 carbon atoms or a halogen atom,
  heating the mixture to a temperature lower than the boiling point of said solvent,
  cooling the mixture to form the amine salt of (+)-trans-chrysanthemic acid, and
  recovering (+)-trans-chrysanthemic acid.

2. The process of claim 1 wherein said amine is (+)-α-(p-methylbenzyl)benzylamine.

3. The process of claim 1 wherein said amine is (+)-α-(p-chlorobenzyl)benzylamine.

4. The process of claim 1 wherein said organic solvent is acetone.

5. The process of claim 1 wherein said organic solvent is a mixture of methanol and water.

6. The process of claim 1 wherein said organic solvent is dioxane.

7. The process of claim 1 wherein said organic solvent is a mixture of ethanol and water.

References Cited

FOREIGN PATENTS 1,536,458  7/1968  France _____ 260—514

OTHER REFERENCES

Eliel, Stereochemistry of Carbon Compounds, pp. 49–53 (1962).

LORRAINE A. WEINBERGER, Primary Examiner

R. GERSTL, Assistant Examiner

U.S. Cl. X.R.

260—501.1, 570.5 R